United States Patent
Chintalapati et al.

(10) Patent No.: US 9,896,752 B2
(45) Date of Patent: Feb. 20, 2018

(54) STAINLESS STEEL ALLOYS, TURBOCHARGER TURBINE HOUSINGS FORMED FROM THE STAINLESS STEEL ALLOYS, AND METHODS FOR MANUFACTURING THE SAME

(71) Applicant: HONEYWELL INTERNATIONAL INC., Morristown, NJ (US)

(72) Inventors: Pavan Chintalapati, Karnataka (IN); Marc Wilson, Deyvillers (FR); Rayad Benchiheub, Lorraine (FR); Philippe Renaud, Sanchey (FR); Gary Agnew, Moravia (CZ); Nicolas Devulder, Vaud (CH)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 603 days.

(21) Appl. No.: 14/447,754

(22) Filed: Jul. 31, 2014

(65) Prior Publication Data
US 2016/0177428 A1    Jun. 23, 2016

(51) Int. Cl.
*C22C 38/44* (2006.01)
*C22C 38/48* (2006.01)
(Continued)

(52) U.S. Cl.
CPC ............ *C22C 38/58* (2013.01); *C22C 38/001* (2013.01); *C22C 38/02* (2013.01); *C22C 38/04* (2013.01); *C22C 38/34* (2013.01); *C22C 38/44* (2013.01); *C22C 38/48* (2013.01); *F01D 25/005* (2013.01); *F01D 25/24* (2013.01); *F02C 6/12* (2013.01); *F01N 13/16* (2013.01); *F05D 2220/40* (2013.01); *F05D 2300/13* (2013.01);
(Continued)

(58) Field of Classification Search
None
See application file for complete search history.

(56) References Cited

U.S. PATENT DOCUMENTS 2,990,275 A    6/1961   Binder et al.
3,561,953 A    2/1971   Niimi et al.
(Continued)

FOREIGN PATENT DOCUMENTS

CN    1023328 C    12/1993
CN    1916220 A    2/2007
(Continued)

OTHER PUBLICATIONS

Extended EP Search Report for Application No. 15177505.3-1353 dated Jul. 12, 2015.
(Continued)

*Primary Examiner* — Deborah Yee
(74) *Attorney, Agent, or Firm* — Lorenz & Kopf, LLP

(57) ABSTRACT

Disclosed is an austenitic stainless steel alloy that includes, by weight, about 22% to about 28% chromium, about 3.5% to about 6.5% nickel, about 1% to about 6% manganese, about 0.5% to about 2.5% silicon, about 0.5% to about 1.5% tungsten, about 0.2% to about 0.8% molybdenum, about 0.2% to about 0.8% niobium, about 0.3% to about 0.6% carbon, about 0.2% to about 0.8% nitrogen, and a balance of iron. The alloy is suitable for use in turbocharger turbine housing applications for temperature up to about 1020° C.

18 Claims, 4 Drawing Sheets

(51) Int. Cl.

| | | |
|---|---|---|
| *C22C 38/58* | (2006.01) | |
| *C22C 38/00* | (2006.01) | |
| *F01D 25/24* | (2006.01) | |
| *F02C 6/12* | (2006.01) | |
| *C22C 38/02* | (2006.01) | |
| *C22C 38/04* | (2006.01) | |
| *C22C 38/34* | (2006.01) | |
| *F01D 25/00* | (2006.01) | |
| *F01N 13/16* | (2010.01) | |

(52) U.S. Cl.
CPC .. *F05D 2300/131* (2013.01); *F05D 2300/132* (2013.01); *F05D 2300/161* (2013.01); *F05D 2300/171* (2013.01)

(56) References Cited

U.S. PATENT DOCUMENTS

| | | | |
|---|---|---|---|
| 3,969,109 | A | 7/1976 | Tanczyn |
| 4,272,305 | A | 6/1981 | Weingerl et al. |
| 4,391,635 | A | 7/1983 | Murakami et al. |
| 4,711,677 | A | 12/1987 | Mendelson |
| 4,798,635 | A | 1/1989 | Bernhardsson et al. |
| 4,929,419 | A | 5/1990 | Wegman et al. |
| 5,019,332 | A | 5/1991 | Wegman et al. |
| 5,238,508 | A | 8/1993 | Yoshitake et al. |
| 5,501,835 | A | 3/1996 | Watanabe et al. |
| 5,672,215 | A | 9/1997 | Azuma et al. |
| 6,245,289 | B1 | 6/2001 | Dodd |
| 6,383,310 | B1 | 5/2002 | Otsuka et al. |
| 6,761,777 | B1 | 7/2004 | Radon |
| 7,255,755 | B2 | 8/2007 | Maziasz et al. |
| 7,780,908 | B2 | 8/2010 | Hsieh et al. |
| 7,785,427 | B2 | 8/2010 | Maziasz et al. |
| 8,043,446 | B2 | 10/2011 | Jung et al. |
| 8,192,682 | B2 | 6/2012 | Maziasz et al. |
| 8,241,558 | B2 | 8/2012 | Hayashi et al. |
| 2005/0194073 | A1 | 9/2005 | Hamano et al. |
| 2007/0163679 | A1 | 7/2007 | Fujisawa et al. |
| 2007/0215252 | A1 | 9/2007 | Takabayashi et al. |
| 2007/0217941 | A1 | 9/2007 | Hayashi et al. |
| 2009/0129967 | A1 | 5/2009 | Goller |
| 2011/0132499 | A1 | 6/2011 | Yamanaka et al. |
| 2011/0176912 | A1 | 7/2011 | Schall et al. |
| 2011/0176914 | A1 | 7/2011 | Schall et al. |
| 2011/0182749 | A1 | 7/2011 | Schall et al. |
| 2011/0250088 | A1 | 10/2011 | Samuelsson et al. |
| 2012/0201712 | A1 | 8/2012 | Oshchepkov |
| 2013/0022488 | A1 | 1/2013 | Genma et al. |
| 2013/0058825 | A1 | 3/2013 | Fukae et al. |
| 2013/0108426 | A1 | 5/2013 | Zhu et al. |
| 2013/0251585 | A1 | 9/2013 | Fukae et al. |
| 2014/0212277 | A1* | 7/2014 | Uesugi ................ F01D 17/145 415/151 |

FOREIGN PATENT DOCUMENTS

| | | |
|---|---|---|
| CN | 103103450 A | 5/2013 |
| EP | 0231492 A1 | 12/1986 |
| EP | 0207697 B1 | 9/1989 |
| EP | 0467756 B1 | 12/1995 |
| GB | 803816 | 11/1958 |
| GB | 831372 | 3/1960 |
| JP | 03291359 A | 12/1991 |
| JP | 256908 A | 9/1994 |
| JP | 2910659 B2 | 6/1999 |
| JP | H11293412 A | 10/1999 |
| JP | 2005281869 A | 10/2005 |
| WO | 1989009843 A1 | 10/1989 |
| WO | 2009068722 A1 | 6/2009 |
| WO | 2011124970 A1 | 10/2011 |
| WO | 2012158332 A2 | 11/2012 |

OTHER PUBLICATIONS

USPTO Office Action for U.S. Appl. No. 14/447,772 dated May 11, 2016.
EP Examination Report for Application No. 15177413.0-1373 dated Aug. 8, 2016.
Kovach, C.W.; High Performance Stainless Steels; http://www.parrinst.com/wp-content/uploads/downloads/2011/07/Parr_High-Performance-Stainless-Steels-Corrosion-Info.pdf; Sep. 16, 2011.
EP Extended Search Report for Application No. EP 15177413.0 dated Dec. 15, 2015.
USPTO Notice of Allowance for U.S. Appl. No. 14/447,772 dated Oct. 13, 2016.
Extended EP Search Report for Application No. 16201895.6-1373 dated Apr. 18, 2017.
EP Examination Report for Application No. 15177505.3-1373 dated Dec. 23, 2016.

* cited by examiner

STAINLESS STEEL ALLOYS, TURBOCHARGER TURBINE HOUSINGS FORMED FROM THE STAINLESS STEEL ALLOYS, AND METHODS FOR MANUFACTURING THE SAME

TECHNICAL FIELD

The present disclosure generally relates to stainless steel alloys. More particularly, the present disclosure relates to stainless steel alloys used for casting applications, for example turbine and turbocharger housings, exhaust manifolds, and combustion chambers, that exhibit oxidation resistance at elevated temperatures, and method for manufacturing the same.

BACKGROUND

During operation, automotive or aircraft turbocharger housings are subjected to elevated operating temperatures. These housings must be able to contain a turbine wheel generating very high rotational speeds. Exhaust gas from the automotive or aircraft engine initially contacts the turbocharger in metal sections, such as the gas inlet area of the turbocharger, at elevated temperatures. As high-speed performance improves through exhaust temperature increase, there have been attempts to gradually raise the exhaust temperature of the engine. Due to these high temperatures, the thermal load on the parts such as the exhaust manifold and the turbine housing becomes very great.

Various problems have been encountered by these increased exhaust gas temperatures contacting metal sections of the turbocharger. For example, one problem caused by the exhaust temperature rise is the problem of thermal deformation of the material, wherein the turbine housing and exhaust manifold, which alternates between regions of high temperature and low temperature is accompanied by thermal expansion and thermal shrinkage depending on the situation, which can cause surface oxidation wrinkles by such thermal deformation, and which can progress and develop into a penetration crack.

In order to overcome the challenges associated with higher operating temperatures, prior art alloys used in turbocharger applications have included alloys of higher nickel content such as commercially available high nickel ductile iron casting alloys. Examples of these are NiResist™ developed by the International Nickel Company, or HK30, a chromium-nickel-iron stainless steel alloy containing approximately 25% chromium and 20% nickel, with the balance essentially iron. The HK series stainless steel alloys in general have about 18-22% nickel and are fully austenitic.

The HK stainless steel alloys are strong stainless steel casting alloys, in terms of creep strength. However, while meeting the high temperature property requirements for turbocharger housings, they are quite expensive because of their high nickel content. Further, due to the sudden rise of the Ni price recently, there has been substantial concern over the cost of materials that have a high nickel content.

Accordingly, there is a need for stainless steel alloys useful in turbocharger applications that are able to withstand the higher operating temperatures produced by modern engines, but that minimize the expensive nickel content. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Stainless steel alloys, turbocharger turbine housings, and methods of manufacturing turbocharger turbine housings are provided.

In an embodiment, by way of example only, an austenitic stainless steel alloy includes, by weight, about 22% to about 28% chromium, about 3.5% to about 6.5% nickel, about 1% to about 6% manganese, about 0.5% to about 2.5% silicon, about 0.5% to about 1.5% tungsten, about 0.2% to about 0.8% molybdenum, about 0.2% to about 0.8% niobium, about 0.3% to about 0.6% carbon, about 0.2% to about 0.8% nitrogen, and a balance of iron.

In another embodiment, by way of example only, a turbocharger turbine housing includes an austenitic stainless steel alloy that includes, by weight, about 22% to about 28% chromium, about 3.5% to about 6.5% nickel, about 1% to about 6% manganese, about 0.5% to about 2.5% silicon, about 0.5% to about 1.5% tungsten, about 0.2% to about 0.8% molybdenum, about 0.2% to about 0.8% niobium, about 0.3% to about 0.6% carbon, about 0.2% to about 0.8% nitrogen, and a balance of iron.

In yet another embodiment, a method of fabricating a turbocharger turbine housing include forming the turbocharger turbine housing from an austenitic stainless steel alloy that includes, by weight, about 22% to about 28% chromium, about 3.5% to about 6.5% nickel, about 1% to about 6% manganese, about 0.5% to about 2.5% silicon, about 0.5% to about 1.5% tungsten, about 0.2% to about 0.8% molybdenum, about 0.2% to about 0.8% niobium, about 0.3% to about 0.6% carbon, about 0.2% to about 0.8% nitrogen, and a balance of iron.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the stainless steel alloys, turbocharger turbine housings, and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The turbocharger turbine housing, usually a cast stainless steel or cast iron, is the most expensive component of the turbocharger. Reduction in cost of the housing will have a direct effect on the cost of the turbocharger. In order to withstand the high operating temperatures commonly produced by exhaust gases impinging on the turbine housing, turbine housing materials are usually alloyed with elements such as chromium and nickel in addition to other carbide forming elements, resulting in increased cost. Reducing the content and/or eliminating these expensive alloying elements will have a direct effect on the cost of the turbine housing.

Typical embodiments of the present disclosure reside in a motor vehicle equipped with a gasoline powered internal combustion engine ("ICE") and a turbocharger. The turbocharger is equipped with a unique combination of features that may, in various embodiments, provide efficiency benefits by relatively limiting the amount of (and kinetic energy of) secondary flow in the turbine and/or compressor, as compared to a comparable unimproved system.

Figure 1:
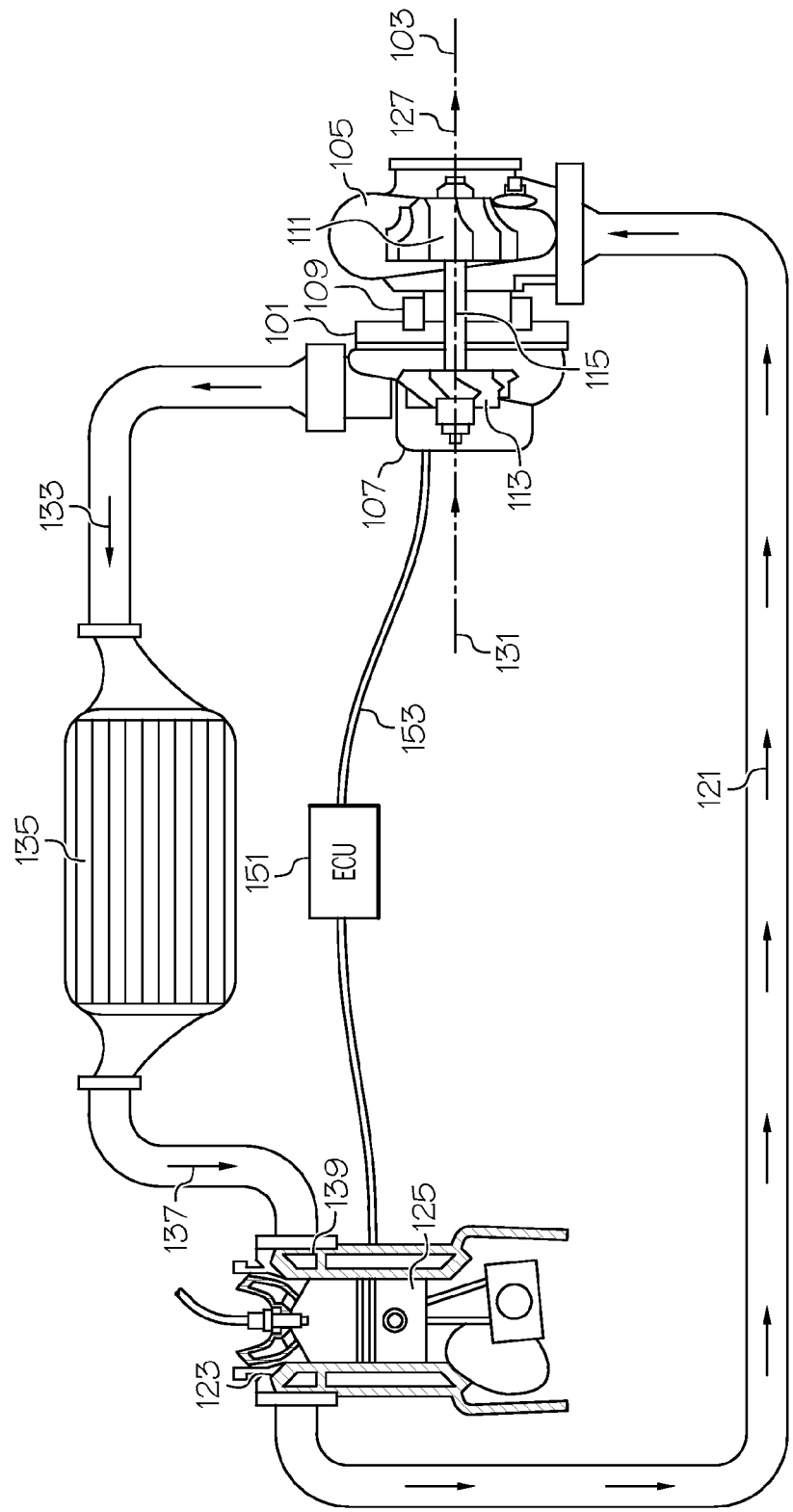
FIG. 1 is a system view of an embodiment of a turbocharged internal combustion engine in accordance with the present disclosure.
Figure 2:
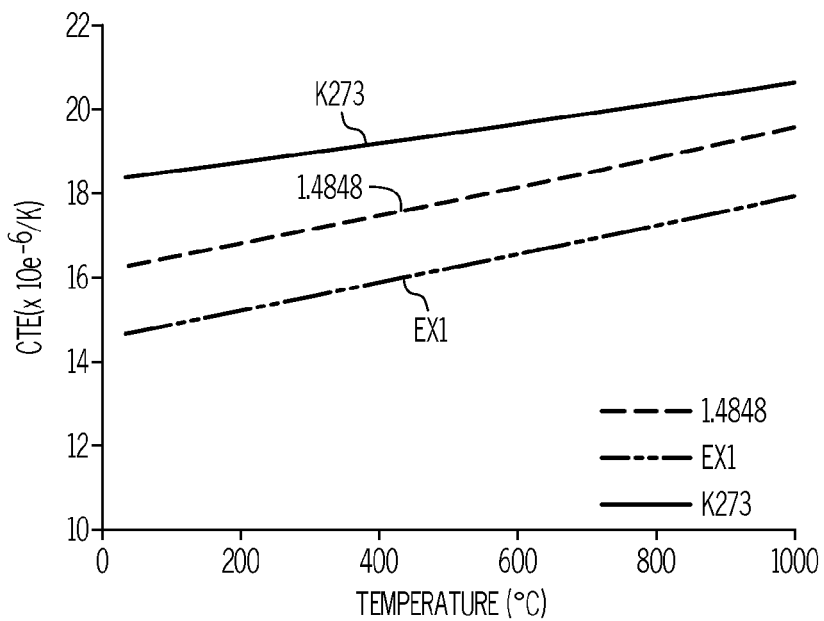
FIG. 2 is a plot illustrating a comparison of the coefficient of thermal expansion of certain stainless steel alloys.

With reference to FIGS. 1-2, an exemplary embodiment of a turbocharger 101 having a radial turbine and a radial compressor includes a turbocharger housing and a rotor configured to rotate within the turbocharger housing around an axis of rotor rotation 103 during turbocharger operation on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a radial turbine wheel 111 located substantially within the turbine housing 105, a radial compressor wheel 113 located substantially within the compressor housing 107, and a shaft 115 extending along the axis of rotor rotation 103, through the bearing housing 109, to connect the turbine wheel 111 to the compressor wheel 113.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel 111 (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

Turbochargers can be designed to operate at a variety of temperatures, depending on the configuration of the turbocharger and the desired output. As used herein, the term operating temperature refers to the maximum temperature of exhaust gas designed to be experienced by the turbine housing and blade components of the turbocharger. Stainless steel 1.4848, well-known in the art, with its specification for nickel between 19% and 22% is an exemplary prior art material for turbine housing applications between 1000° C.-1020° C. Alternatively, K273 with lower nickel content can be used for housing temperatures up to 1020° C. However, due to a higher carbon content, K273 poses manufacturing concerns in terms of machinability. Also, laboratory oxidation tests indicated lower oxidation resistance of K273 in comparison with other stainless steels recommended for such high temperature applications. Thus material with less machining issues and better oxidation resistance will be a suitable alternative to the available options. TABLE 1, set forth below, provides the specifications for stainless steels 1.4848 and K273.

TABLE 1

Composition of K273 and 1.4848 Stainless Steels

| Elements | K273 | | 1.4848 | |
| --- | --- | --- | --- | --- |
| | Min (%) | Max (%) | Min (%) | Max (%) |
| Carbon | 0.75 | 0.9 | 0.3 | 0.5 |
| Silicon | 0.3 | 1 | 1 | 2.5 |
| Chromium | 18 | 21 | 23 | 27 |
| Nickel | 4.5 | 5.5 | 19 | 22 |
| Molybdenum | 0.8 | 1.2 | 0 | 0.5 |
| Manganese | 4.5 | 5.5 | 0 | 2 |
| Tungsten | 0.8 | 1.2 | — | — |
| Niobium | 0.65 | 0.8 | 0 | 1.6 |
| Phosphorous | 0 | 0.02 | 0 | 0.04 |
| Sulphur | 0 | 0.02 | 0 | 0.04 |
| Nitrogen | 0.2 | 0.4 | — | — |
| Iron | Balance | | Balance | |

As such, embodiments of the present disclosure are directed to improvements over the currently available stainless steel alloys for use in turbochargers having operating temperatures up to about 1020° C. In particular, embodiments of the present disclosure are directed to stainless steel alloys that have a nickel content that is less than stainless steel 1.4848 for cost considerations, and better machinability than K273 for manufacturing considerations. The stainless steel alloys described herein include iron alloyed with various alloying elements, as are described in greater detail below in weight percentages based on the total weight of the alloy.

In an embodiment, the stainless steel alloy of the present disclosure includes from about 0.3% to about 0.6% carbon (C), for example about 0.4% to about 0.5% C. C has a function of improving the fluidity and castability of a melt. C also has a function of improving the castability by forming eutectic carbide with niobium (which, as discussed in greater detail below, is included in the alloy). To exhibit such functions effectively, the amount of C should be 0.3% or more. Further, C is effective for strengthening a material by solid solution strengthening. To maximize the corrosion resistance, the content of C is lowered into about 0.6% and below.

In an embodiment, the stainless steel alloy of the present disclosure includes from about 0.5% to about 2.5% silicon (Si), for example about 1.0% to about 2.0% Si. Si has effects of increasing the stability of its metal structure and its oxidation resistance. Further, it has a function as a deoxidizer and also is effective for improving castability and reducing pin holes in the resulting cast products, when present in an amount greater than about 0.5%. If the content of Si is excessive, Si deteriorates the mechanical property such as impact toughness of steel. Therefore, the content of Si is preferably limited to about 2.5% and below.

In an embodiment, the stainless steel alloy of the present disclosure includes from about 22% to about 28% chromium (Cr), for example about 23% to about 27% Cr, such as from about 24% to about 26% Cr. On the other hand, if it is added excessively, coarse primary carbides of Cr are formed, resulting in extreme brittleness. When the content of Cr increases, the corrosion resistance increases, but the content of expensive Ni should be also increased to maintain the volume fraction. As such, the content of Cr is preferably limited to a maximum of about 28% so as to maintain the volume fraction of the stainless steel and the corrosion resistance.

In an embodiment, the stainless steel alloy of the present disclosure includes from about 3.5% to about 6.5% nickel (Ni), for example about 4.0% to about 6.0% Ni, such as from about 4.5% to about 5.5% Ni. Ni, together with manganese and nitrogen (which as described in greater detail below are included in the alloy of the present disclosure), is an element to stabilize the austenite phase. To reduce a production cost, if the content of expensive Ni is lowered, the decrement of Ni can be replaced by increasing the content of manganese and nitrogen that form the austenite phase. However, if the content of Ni is excessively lowered, manganese and nitrogen would be excessively needed so that the corrosion resistance and the hot formability characteristics are deteriorated. Thus, the content of Ni preferably ranges from about 3.5% to about 6.5%.

In an embodiment, the stainless steel alloy of the present disclosure includes from about 0.2% to about 0.8% molybdenum (Mo), for example about 0.4% to about 0.6% Mo. To utilize its positive effect on pitting corrosion resistance, molybdenum should be added with minimum 0.2%, preferably with minimum 0.4%, to the steel according to present disclosure. As molybdenum also increases the risk of intermetallic phase formation, the level should be maximized to 0.8%, and preferably less than 0.6%. However, if the content of Mo is excessive, Mo is likely to form the sigma phase when it is annealed, thereby deteriorating the corrosion resistance and impact resistance.

In an embodiment, the stainless steel alloy of the present disclosure includes from about 1.0% to about 6.0% manganese (Mn), for example about 1.5% to about 5.5% Mn, such as from about 2.0% to about 5.0% Mn. Mn is effective like Si as a deoxidizer for the melt, and has a function of improving the fluidity during the casting operation. To exhibit such function effectively, the amount of Mn is about 6.0% or less, preferably 5.0% or less. Mn generally has a content of greater than about 1.0% to adjust a metal flow rate. However, when the content of Mn is excessive, Mn is combined with sulfur of the steel and forms excessive levels of manganese sulfide, thereby deteriorating the corrosion resistance and the hot formability. Thus, the upper limit content of Mn is limited to 6.0%.

In an embodiment, the stainless steel alloy of the present disclosure includes from about 0.5% to about 1.5% tungsten (W), for example about 0.8% to about 1.2% W. W has an influence on steels very similar to that of molybdenum and it is very common to use both elements to improve corrosion resistance. As tungsten is expensive, the content should not be larger than about 1.5%. W is also included for increased hot workability of the stainless steel.

In an embodiment, the stainless steel alloy of the present disclosure includes from about 0.2% to about 0.8% niobium (Nb), for example about 0.4% to about 0.6% Nb. The heat-resistant, steel of the present disclosure is provided with a high castability by forming eutectic carbides of Nb as well as a high strength and ductility.

Nitrogen (N) is an element capable of improving the high-temperature strength and the thermal fatigue resistance like C, and such effects can be obtained when the amount of N is 0.2% or more. Accordingly, in an embodiment, the stainless steel alloy includes from about 0.2% to about 0.8% N, for example from about 0.4% to about 0.6% N. To ensure the production stability and to avoid the brittleness due to the precipitation of Cr nitrides, the upper limit of N should be about 0.8%. N, together with Ni, is one of elements that contribute stabilization of an austenite phase. As the content of N increases, the corrosion resistance and high strengthening are achieved. However, when the content of N is too high, the hot formability of steel is deteriorated, thereby lowering the production yield thereof. Therefore, the content of N preferably ranges up to a maximum of about 0.8%.

Certain impurities may also be present in the stainless steel alloy of the present disclosure. The amounts of such impurities are minimized as much as practical. In an embodiment, phosphorus (P) may be present in the alloy, but is minimized to about 0.03% or less. P is seeded in the grain boundary or an interface, and is likely to deteriorate the corrosion resistance and toughness. Therefore, the content of P is lowered as low as possible. Preferably, the upper limit content of P is limited to 0.03% in consideration of the efficiency of a refining process. The contents of harmful impurities, such as P are as small as possible. However, due to cost concerns associated with removal of these impurities, and the P content is limited to 0.03%.

In an embodiment, sulfur (S) may be present in the alloy, but is minimized to about 0.03% or less. S in steels deteriorates hot workability and can form sulfide inclusions that influence pitting corrosion resistance negatively. It should therefore be limited to less than 0.03%. S deteriorates the hot formability, or forms MnS together with Mn, thereby deteriorating the corrosion resistance. Therefore, the content of S is lowered as low as possible. The contents of harmful impurities, such as S (sulfur), are as small as possible. However, due to cost concerns associated with removal of these impurities, the S content is limited to about 0.03%.

Boron (B), calcium (Ca), and cerium (Ce) can optionally be added in very small quantities in steels to improve hot workability. The preferred levels are for B, Ca, and Ce are less than about 0.005%.

TABLE 2 sets forth the composition of an exemplary embodiment of the present disclosure, in accordance with the description provided above.

TABLE 2

Composition of the Stainless Steel Alloy

| Elements | Min (%) | Max (%) |
|---|---|---|
| Carbon | 0.4 | 0.5 |
| Silicon | 1 | 2 |
| Chromium | 24 | 26 |
| Nickel | 4.5 | 5.5 |
| Molybdenum | 0.4 | 0.6 |
| Manganese | 2.0 | 5.0 |
| Tungsten | 0.8 | 1.2 |
| Niobium | 0.4 | 0.6 |
| Phosphorous | | 0.03 |
| Sulphur | | 0.03 |
| Nitrogen | 0.4 | 0.6 |
| Boron | | 0.005 |
| Iron | Balance | |

EXAMPLE

A representative alloy in accordance with the composition set forth above in TABLE 2 was tested using theoretical simulation software, and compared against stainless steels 1.4848 and K273. Among other properties, higher thermal conductivity, lower coefficient of thermal expansion (CTE), lower specific heat, and higher mechanical properties are generally desirable for turbine housing materials.

Figure 3:
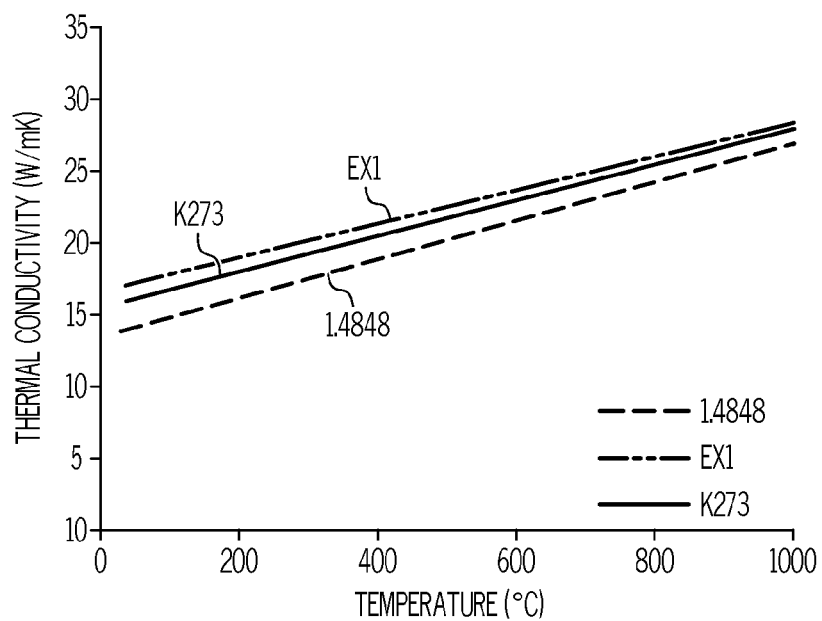
FIG. 3 is a plot illustrating a comparison of the thermal conductivity of certain stainless steel alloys.
Figure 4:
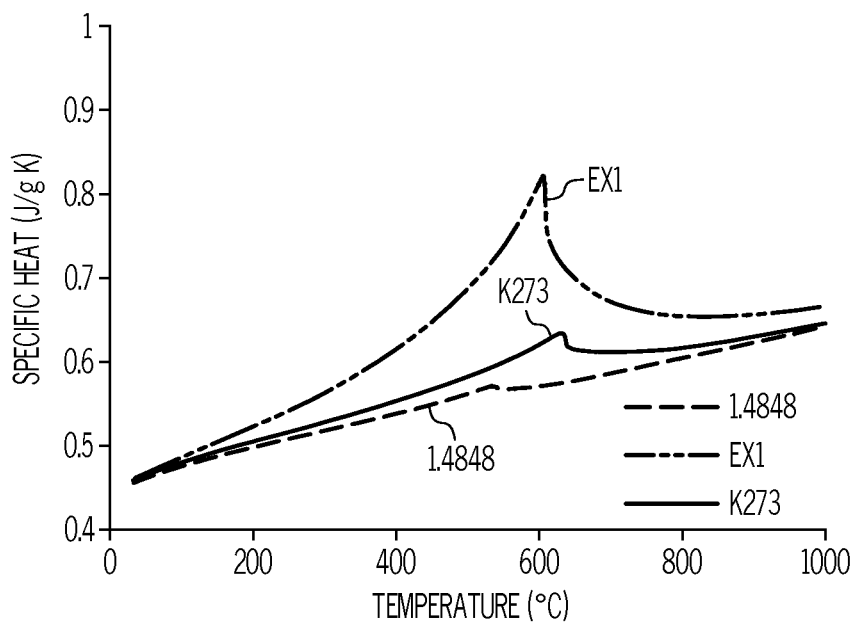
FIG. 4 is a plot illustrating a comparison of the specific heat of certain stainless steel alloys.

A comparison of simulated properties from K273, 1.4848 and the inventive alloy disclosed herein are summarized as follows: Among the thermal properties, the tested embodiment of the present disclosure (referred to in this Example as "EX1") exhibited lower CTE and higher thermal conductivity than K273 and 1.4848 (FIGS. 2 and 3, respectively), while the specific heat for 1.4848 was better than the other two alloys (FIG. 4).

Figure 5:
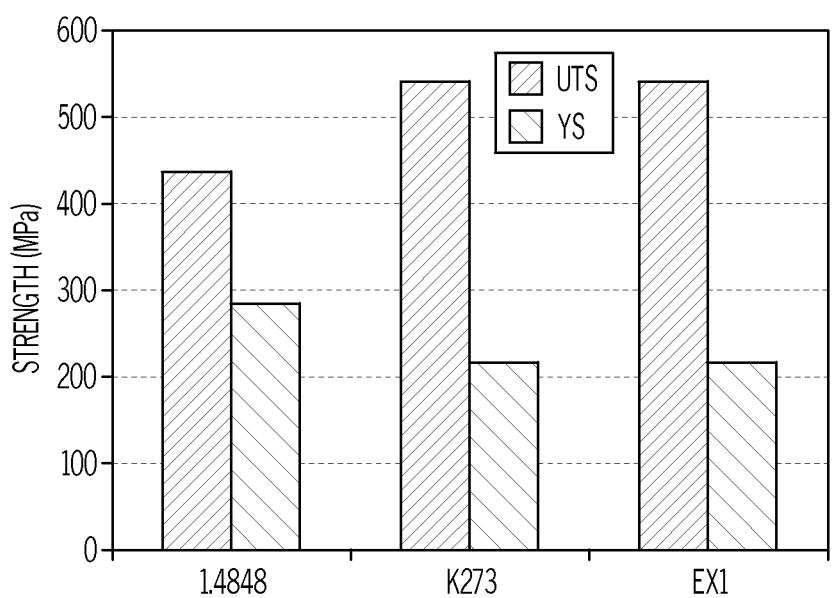
FIG. 5 is a plot illustrating a comparison of the ultimate and yield strengths at room temperature of certain stainless steel alloys.
Figure 6:
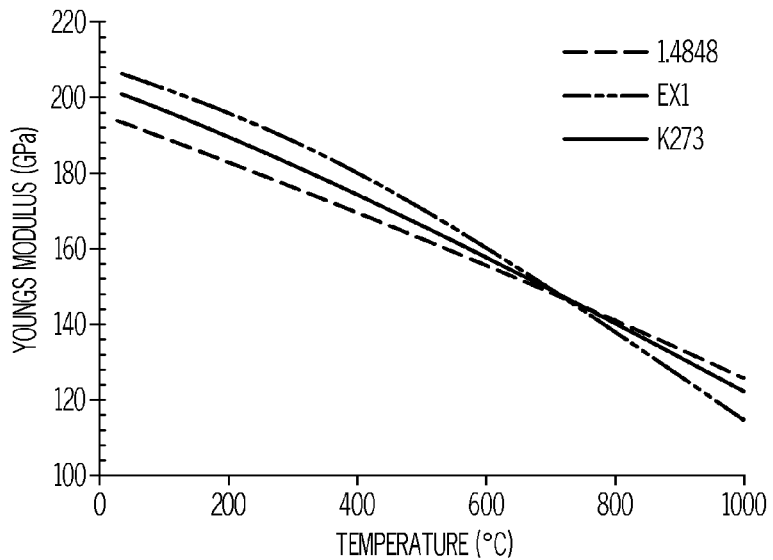
FIG. 6 is a plot illustrating a comparison of the Youngs' modulus of certain stainless steel alloys.
Figure 7:
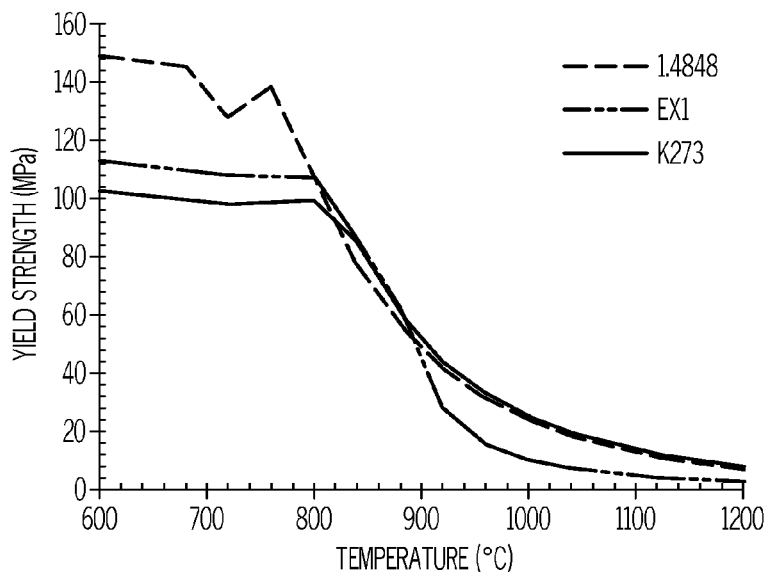
FIG. 7 is a plot illustrating a comparison of the high temperature yield strength of certain stainless steel alloys.

Among the mechanical properties, the room temperature yield strength of EX1 was higher than 1.4848 and comparable with K273 (FIG. 5), while the Youngs' modulus was similar for all the three alloys (FIG. 6). High temperature yield strength at 1020° C. was similar for all three alloys (FIG. 7).

As such, embodiments of the present disclosure provide numerous benefits over the prior art, such as stainless steels 1.4848 and K273. For example, in accordance with the present disclosure, the amount of carbon is optimized at 0.3-0.6 wt. %, which limits the amount of carbides in the matrix, improving machinability and enhancing oxidation resistance. Further, the amount of silicon is modified (0.5-2.5 wt. %) to improve the oxidation resistance. Further, the amount of niobium and molybdenum were adapted to minimize carbides in the matrix, improve machinability and reduce cost, while maintaining castability and high temperature properties. Still further, the range of manganese has been specifically targeted to provide sufficient replacement of nickel as an austenite former, while minimizing the inherent negative effects of manganese addition upon machinability and oxidation resistance. Thus, due to lower cost, lower carbide content and higher oxidation resistance, embodiments of the present disclosure are suitable as a lower cost alloy for turbine housing materials (for example) for operation up to 1020° C.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. An austenitic stainless steel alloy, comprising, by weight:
   22% to 28% chromium;
   3.5% to 6.5% nickel;
   1% to 6% manganese;
   0.5% to 2.5% silicon;
   0.8% to 1.2% tungsten;
   0.2% to 0.8% molybdenum;
   0.2% to 0.8% niobium;
   0.3% to 0.6% carbon;
   0.2% to 0.8% nitrogen; and
   a balance of iron, with the proviso that the stainless steel alloy excludes calcium.

2. The austenitic stainless steel alloy of claim 1 comprising 23% to 27% chromium.

3. The austenitic stainless steel alloy of claim 1 comprising 4.0% to 6.0% nickel.

4. The austenitic stainless steel alloy of claim 1 comprising 1.5% to 5.5% manganese.

5. The austenitic stainless steel alloy of claim 1 comprising 1.0% to 2.0% silicon.

6. The austenitic stainless steel alloy of claim 1 comprising 0.4% to 0.6% molybdenum.

7. The austenitic stainless steel alloy of claim 1 comprising 0.4% to 0.6% niobium.

8. The austenitic stainless steel alloy of claim 1 comprising 0.4% to 0.5% carbon.

9. The austenitic stainless steel alloy of claim 1 comprising 0.4% to 0.6% nitrogen.

10. An turbocharger turbine housing comprising:
    an austenitic stainless steel alloy, wherein the austenitic stainless steel alloy comprises, by weight:
    22% to 28% chromium;
    3.5% to 6.5% nickel;
    1% to 6% manganese;
    0.5% to 2.5% silicon;
    0.8% to 1.2% tungsten;
    0.2% to 0.8% molybdenum;
    0.2% to 0.8% niobium;
    0.3% to 0.6% carbon;
    0.2% to 0.8% nitrogen; and
    a balance of iron, with the proviso that the stainless steel alloy excludes calcium.

11. The turbocharger turbine housing of claim 10 comprising 23% to 27% chromium.

12. The turbocharger turbine housing of claim 10 comprising 4.0% to 6.0% nickel.

13. The turbocharger turbine housing of claim 10 comprising 1.5% to 5.5% manganese.

14. The turbocharger turbine housing of claim 10 comprising 1.0% to 2.0% silicon.

15. The turbocharger turbine housing of claim 10 comprising 0.4% to 0.6% molybdenum.

16. The turbocharger turbine housing of claim 10 comprising 0.4% to 0.6% niobium.

17. A method of fabricating a turbocharger turbine housing, the method comprising the step of:
   forming the turbocharger turbine housing from an austenitic stainless steel alloy, wherein the austenitic stainless steel alloy comprises, by weight:
   22% to 28% chromium;
   3.5% to 6.5% nickel;
   1% to 6% manganese;
   0.5% to 2.5% silicon;
   0.8% to 1.2% tungsten;
   0.2% to 0.8% molybdenum;
   0.2% to 0.8% niobium;
   0.3% to 0.6% carbon;
   0.2% to 0.8% nitrogen; and
   a balance of iron, with the proviso that the stainless steel alloy excludes calcium.

18. The austenitic stainless steel alloy of claim 1, consisting of, by weight:
   22% to 28% chromium;
   3.5% to 6.5% nickel;
   1% to 6% manganese;
   0.5% to 2.5% silicon;
   0.8% to 1.2% tungsten;
   0.2% to 0.8% molybdenum;
   0.2% to 0.8% niobium;
   0.3% to 0.6% carbon;
   0.2% to 0.8% nitrogen;
   less than or equal to 0.03% each of sulfur and phosphorous; and
   a balance of iron and inevitable/unavoidable impurities.

* * * * *